United States Patent Office.

EDWARD JOSEPH DE SMEDT, OF NEW YORK, N. Y., ASSIGNOR TO NEW YORK IMPROVED ANTHRACITE-COAL COMPANY, OF SAME PLACE.

Letters Patent No. 100,608, dated March 8, 1870.

IMPROVED COMPOSITION FOR PRESERVING TIMBER AND WOOD.

The Schedule referred to in these Letters Patent and making part of the same.

To all whom it may concern:

Be it known that I, EDWARD JOSEPH DE SMEDT, of the city, county, and State of New York, have invented a new and improved Composition for Preserving Timber and Wood generally; and I do hereby declare that the following is a full, clear, and exact description of the same.

The ingredients I employ for this purpose consist, first, of the substance known generally as Ritchie mineral, and also Albertite, either or both being used, as chemically they are nearly the same, both being asphalts or bituminous, and composed principally of asphaltine and bitumen. The following formula, as given by Raignault, a French chemist, will technically express their nature:

Ritchie mineral, carbon 78.22; hydrogen 8.01; oxygen 13.77. Albertite, carbon 86.12; hydrogen 9.87; oxygen 4.91.

The second substance employed is impure naphthaline dead oil; the third, impure benzole; and, fourth, pine or North Carolina tar.

The Ritchie mineral or Albertite is first dissolved by heat in the impure naphthaline dead oil and pine tar, the impure benzole then added, and all well mixed together, forming quite a fluid solution.

The proportion of the several ingredients is about as follows:

To the Ritchie mineral or Albertite, from five hundred to one thousand pounds, add impure naphthaline dead oil, fifteen hundred pounds; impure benzole, fifteen hundred pounds; pine or North Carolina tar, four hundred pounds.

The timber or wood may be saturated with the solution or composition in any proper manner. The most practicable way would probably be to put the timber or wood in a retort, exhaust the air therefrom, and then inject the solution, by means of a force-pump, into the retort under a pressure of from one to two hundred pounds to the square inch. I do not, however, confine myself to any particular means for saturating the timber or wood.

I claim as new, and desire to secure by Letters Patent—

The composition composed of the ingredients specified, or their chemical equivalents, and about in the proportions set forth, for the purpose of saturating timber and wood generally, to preserve the same, or enable it to resist decay, substantially as described.

The above specification of my invention signed by me this 2d day of February, 1870.

E. J. DE SMEDT.

Witnesses:
A. R. HAIGHT,
CHAS. SCHENK.